United States Patent [19]

Lamb et al.

[11] Patent Number: 5,252,069
[45] Date of Patent: Oct. 12, 1993

[54] INSTRUMENT FLIGHT RULES (IFR) TRAINING DEVICE

[75] Inventors: Richard A. Lamb, P.O. Box 626, Hiram, Ga. 30141; Jack J. Gilbert, Roswell, Ga.

[73] Assignee: Richard A. Lamb, Dallas, Ga.

[21] Appl. No.: 859,883

[22] Filed: Mar. 30, 1992

[51] Int. Cl.⁵ .................................................. G09B 9/08
[52] U.S. Cl. ........................................ 434/35; 2/209; 2/11; 2/6.3
[58] Field of Search ............. 434/35, 36; 2/6, 11, 2/209, 432, 433, 448; 351/158; 359/480

[56] References Cited

U.S. PATENT DOCUMENTS

| | | | |
|---|---|---|---|
| 2,510,848 | 6/1950 | Wood | 434/36 |
| 2,572,656 | 10/1951 | Ortenburger | 35/12 |
| 3,108,282 | 10/1963 | Rehman et al. | 2/209 |
| 3,273,164 | 9/1966 | Thomas | 2/209 |
| 3,356,439 | 12/1967 | Magnus | 351/47 |
| 3,423,759 | 1/1969 | Catroppa et al. | 2/209 |
| 3,453,042 | 7/1969 | Cooper | 351/47 |
| 3,499,112 | 3/1970 | Heilmeier | 350/331 |
| 3,942,270 | 3/1976 | Hoyt et al. | 2/6 X |
| 4,106,217 | 8/1978 | Witt | 434/36 |
| 4,119,369 | 10/1978 | Eloranta et al. | 351/47 |
| 4,271,538 | 6/1981 | Montesi et al. | 2/439 |
| 4,298,249 | 11/1981 | Gloor et al. | 350/339 |
| 4,682,374 | 7/1987 | Geiser | 2/209 |
| 4,698,002 | 10/1987 | Gilson | 434/36 |
| 4,856,089 | 8/1989 | Horton | 2/209 X |
| 5,133,596 | 7/1992 | Korny et al. | 351/158 |

FOREIGN PATENT DOCUMENTS

| | | | |
|---|---|---|---|
| 2446562 | 4/1975 | Fed. Rep. of Germany | 2/353 |
| 2126076 | 3/1984 | United Kingdom | 2/6 |

OTHER PUBLICATIONS

Advertisements for assorted head-sets and IFR training devices, Sporty's Pilot Shop, Jan. 1992, pp. 15, 16 & 35.
"Clip & Flip IFR Training Visors", Sporty's Pilot Shop, Jan. 1992, p. 35.
"Over Casters", AOPA Pilot, Jan. 1992, pp. 96 & 98.

Primary Examiner—John J. Wilson
Assistant Examiner—L. Thomas
Attorney, Agent, or Firm—Louis T. Isaf

[57] ABSTRACT

An Instrument Flight Rules (IFR) Training Device for use during aircraft pilot training in conjunction with a headset having a pair of earphones supported by earphone stirrups. In its most preferred embodiment, the training device includes, at least, a mask member for partially occluding a pilot's vision, two arm members extending rearwardly from connections with opposing sides of the mask member, and headset connecting clamps for pivotally connecting the arm members to the headset stirrups, wherein the training device is supported by the headset and movable to a location up and away from a pilot's primary field of vision.

8 Claims, 6 Drawing Sheets

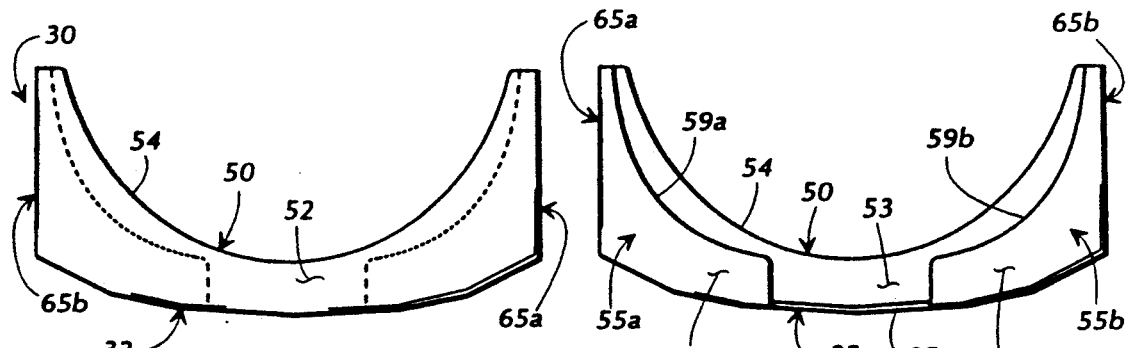
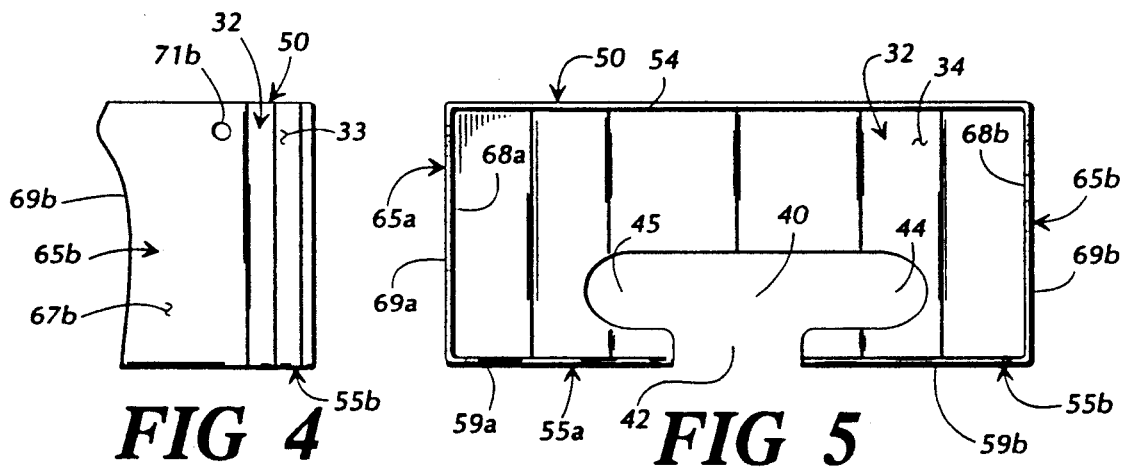
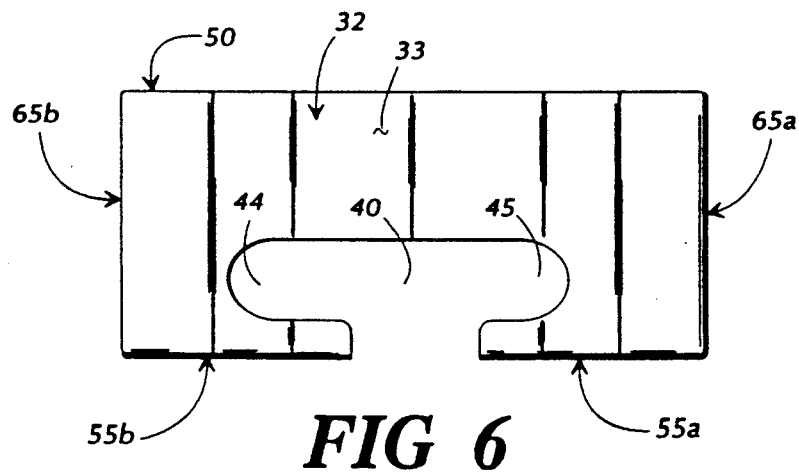

INSTRUMENT FLIGHT RULES (IFR) TRAINING DEVICE

BACKGROUND OF THE INVENTION

The present invention relates generally to the field of training aids for aircraft pilot training, and, in its most preferred embodiments, to the field of Instrument Flight Rules (IFR) vision-directing masks.

It is considered well known that in obtaining, and training to obtain, Instrument Flight Rules (IFR) ratings, many pilots wear various types of hoods, visors, and training glasses to block outside visual references. Although many of the old IFR training devices adequately restrict pilots' views, the old devices are plagued by practical problems relating to how such devices are actually worn by pilots in conjunction with commonly worn headsets.

During flight, many pilots also wear headsets equipped with muff-type earphones and microphones attached through flexible booms. Since cockpits are frequently very noisy, muff-type earphones which cover the ears tend to improve communication and protect the ears by reducing the harmful auditory effects of the continuous noise. Also, use of a headset microphone increases safety since such a microphone provides for hands-free operation.

The old IFR training devices are worn by attaching the devices directly to a pilot's head or existing personal eyewear. The devices which attach directly to a pilot head are attached thereto through arms which fit over a pilot's ears or straps which grip around a pilot's head. Many pilots find such devices uncomfortable when worn by themselves and even more uncomfortable and annoying when worn in conjunction with headsets.

In addition, since many instructors tend to require a pilot to begin IFR training after the flight has begun, and after a headset has been placed on a pilot's head, attaching an old IFR training device often involves great inconvenience and raises additional safety concerns. Pilots who ordinarily wear personal eyewear often find use of the ear-mounted IFR devices unusually cumbersome. On the other hand, pilots who ordinarily do not wear personal eyewear are foreclosed from using the eyewear clip-on IFR devices unless spare pairs of personal eyewear can be located.

There is, therefore, a need in the industry for an IFR training device which addresses these and other related, and unrelated, problems.

SUMMARY OF THE INVENTION

Briefly described, the present invention includes, in its most preferred embodiment, an Instrument Flight Rules (IFR) Training Device for use during aircraft pilot training in conjunction with a headset having a pair of earphones supported by earphone stirrups. The training device includes, at least, a mask member for partially occluding a pilot's vision, two arm members extending rearwardly from connections with opposing sides of the mask member, and headset connecting clamps for pivotally connecting the arm members to the headset stirrups, wherein the training device is supported by the headset and movable to a location up and away from a pilot's primary field of vision.

It is therefore an object of the present invention to provide an IFR training device which is comfortable and easy to use.

Another object of the present invention is to provide an IFR training device which is readily movable between a first position which restricts a pilot's vision and a second position which is up and away from a pilot's primary field of vision.

Yet another object of the present invention is to provide an IFR training device which connects to a headset.

Yet another object of the present invention is to provide an IFR training device which, during use, is adjustably and removably supported by headset stirrups.

Still another object of the present invention is to provide an IFR training device which includes a mask member having both a lateral front portion and rearwardly extending side portions to, at least partially, occlude a pilot's forward and peripheral lines of sight.

Still another object of the present invention is to provide an IFR training device which includes a mask having a facetted front portion for accommodating personal eyewear.

Still another object of the present invention is to provide an IFR training device which includes rearwardly extending arm members which are lengthwise adjustable.

Still another object of the present invention is to provide an IFR training device which includes rearwardly extending arm members which are laterally flexible.

Other objects, features and advantages of the present invention will become apparent upon reading and understanding this specification, taken in conjunction with the accompanying drawings.

BRIEF DESCRIPTION OF THE DRAWINGS

FIG. 2 is a top isolated view of the mask of FIG. 1.

FIG. 3 is a bottom isolated view of the mask of FIG. 1.

FIG. 4 is a right side isolated view of the mask of FIG. 1.

FIG. 5 is a rear isolated view of the mask of FIG. 1.

FIG. 6 is a front isolated view of the mask of FIG. 1.

DETAILED DESCRIPTION OF THE PREFERRED EMBODIMENT

Figure 1:
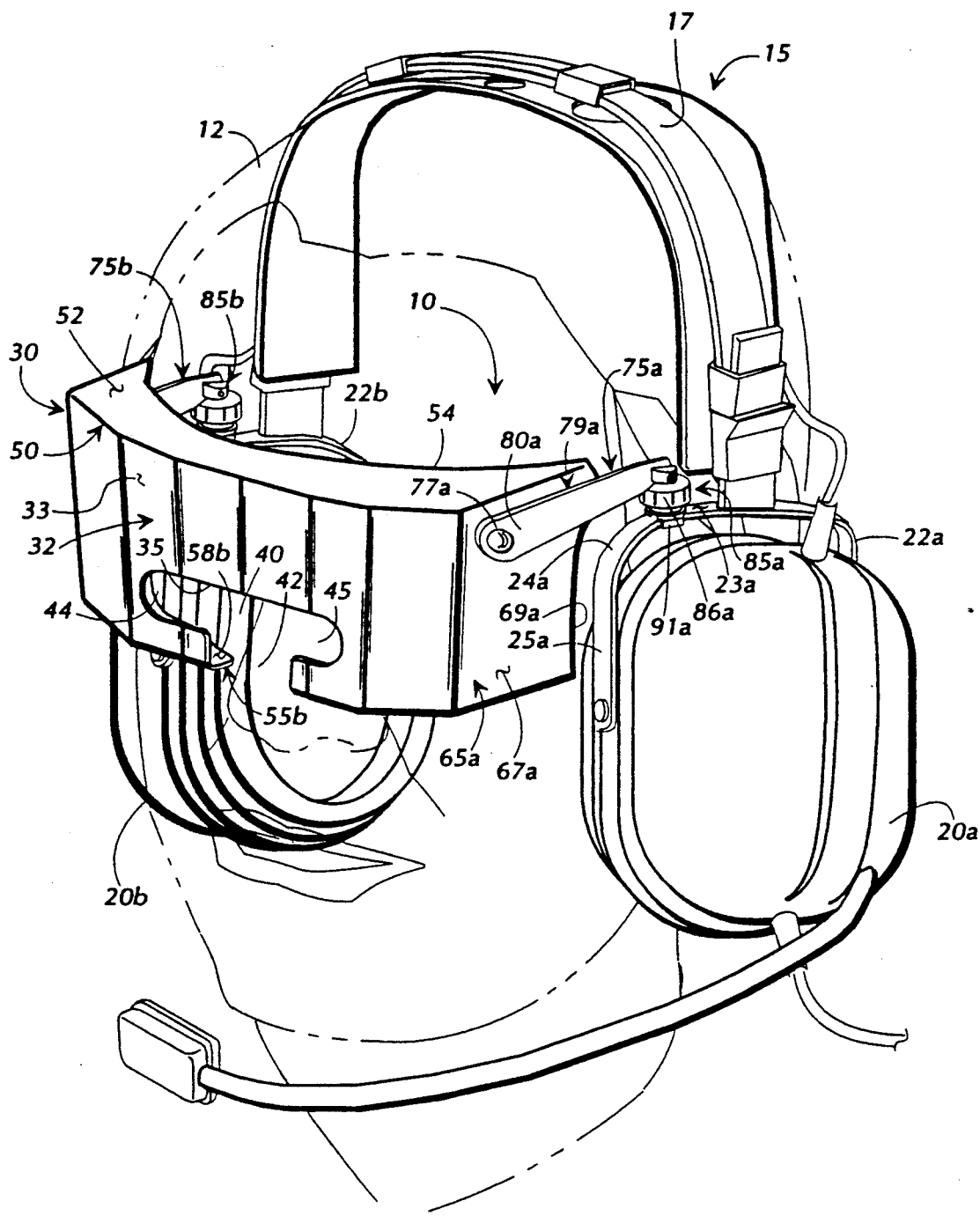
FIG. 1 is a perspective view of an IFR Training Device in accordance with the preferred embodiment of the present invention and shown attached to a headset mounted upon a pilot's head represented by dotted lines.

Referring now in greater detail to the drawings, in which like numerals represent like components throughout the several views, FIG. 1 shows an IFR Training Device 10 in accordance with the preferred embodiment of the present invention. The IFR training device 10 is shown attached to a headset 15 mounted upon a pilot's head 12, represented by dotted lines. The headset 15 is shown including a headband 17 which, through a pair of stirrups 22a, 22b, supports a pair of earphones 20a, 20b from the top of the pilot's head 12 so that the earphones 20a, 20b fit comfortably over the pilot's ears (not shown). The stirrup 22a is shown including stirrup top 23a, stirrup bend 24a, and stirrup side 25a.

Since many of the elements of the mask 30 and the headset 15 exist in pairs, these elements are often described in the singular, and/or without references to the "a" or "b" suffixes, as a matter of convenience and simplicity. References to these elements should therefore be understood as references to the pairs of elements unless the suffixes are included in the references. However, when a suffix is included in a reference, it should be understood that a similar statement could be made about the other corresponding element, unless otherwise indicated by the specification or drawings.

The IFR training device 10 is shown including a mask 30 and two connector assemblies 75 extending rearwardly from the mask 30. Refer also to FIGS. 2-6, which show top, bottom, right side, rear, and front views, respectively, of the mask 30, in accordance with the preferred embodiment of the present invention. The mask 30 is shown including a front portion 32, a top portion 50, side portions 65, and bottom portions 55. The front portion 32, in accordance with the preferred embodiment of the present invention, is shown as a lateral portion including a plurality of vertical facets. Also, the front portion 32 includes a front outer surface 33, a front inner surface 34, and a front aperture edge 35 which defines a viewing aperture 40 and partially defines a lower gap 42. The viewing aperture 40 includes an aperture right side 44 and an aperture left side 45. In the preferred embodiment of the present invention, the aperture right side 44 extends closer to a side portion 65 than the aperture left side 45, as is clearly shown in FIG. 5.

The top portion 50 of the mask 30 extends rearwardly from a connection with the front portion 32 and includes a top outer surface 52, a top inner surface 53, and a curved top facial edge 54. The bottom portions 55 also extend rearwardly from connections with the front portion 32 and include bottom outer surfaces 57, bottom inner surfaces 58, and curved bottom facial edges 59.

The bottom portions 55 are separated by the lower gap 42. The side portions 65 are each connected between the front portion 32, top portion 50, and bottom portions 55 and include side outer surfaces 67, side inner surfaces 68, and side facial edges 69. The side portions 65 also include connector screw holes 71 for attachment to the connector assemblies 75.

Figure 7:
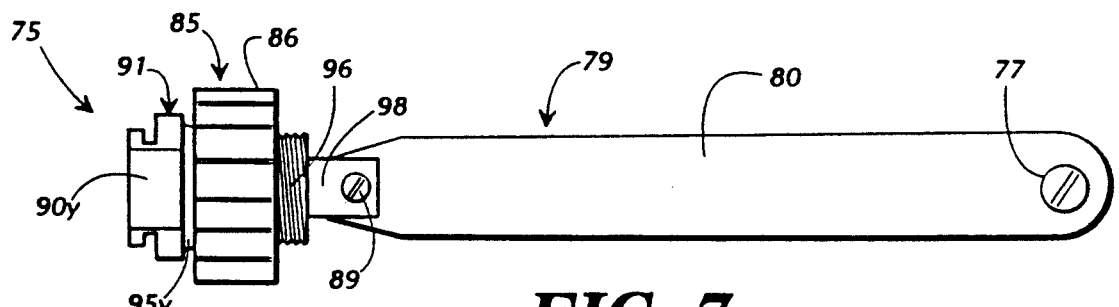
FIG. 7 is a side isolated view of the connector assembly of FIG. 1.
Figure 8:
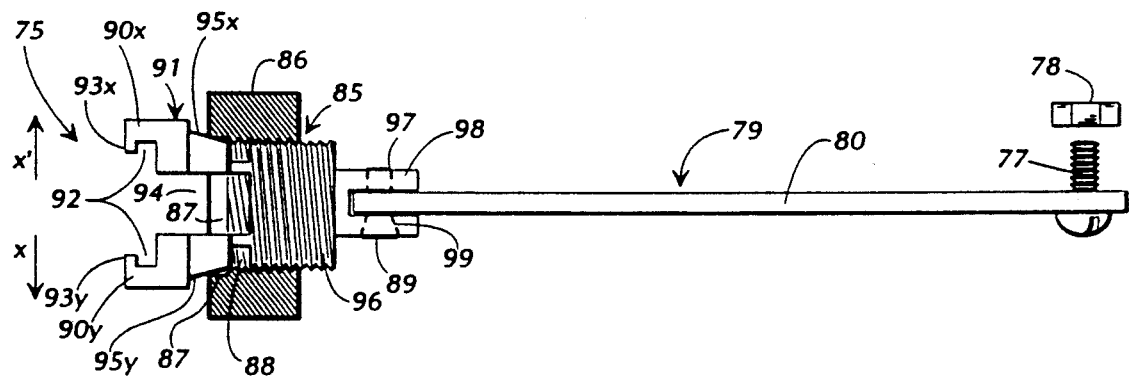
FIG. 8 is a top isolated view of the connector assembly of FIG. 1, showing a cross-sectional view of the clamp nut.
Figure 9:
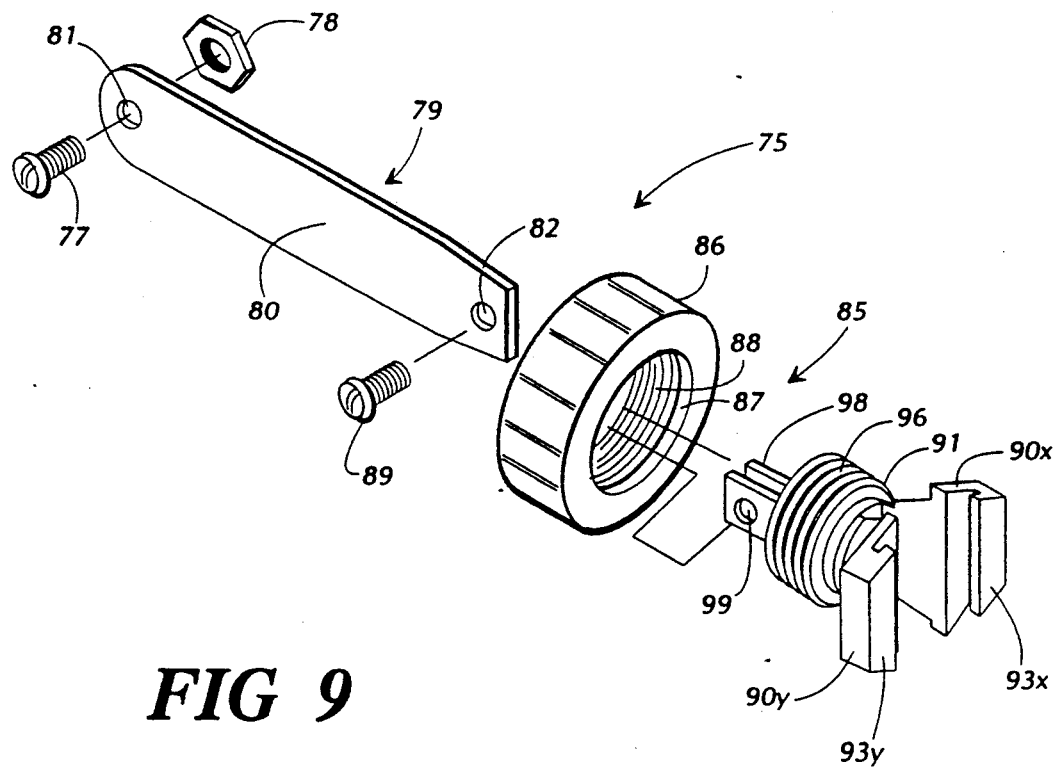
FIG. 9 is an exploded perspective view of the connector assembly of FIG. 1.
Figure 10:
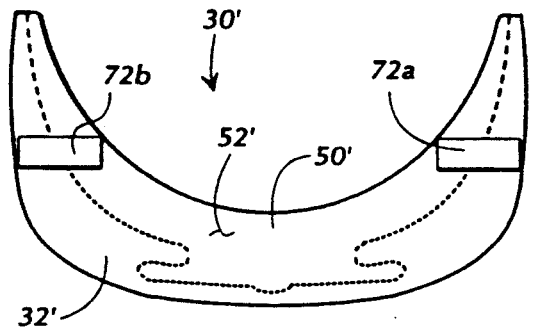
FIG. 10 is a top isolated view of a mask in accordance with an alternate embodiment of the present invention.
Figure 11:
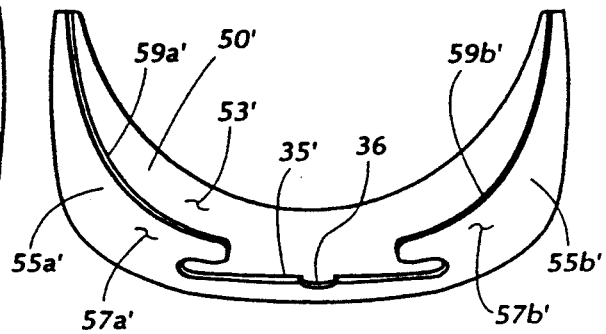
FIG. 11 is a bottom isolated view of the mask of FIG. 10.
Figure 12:
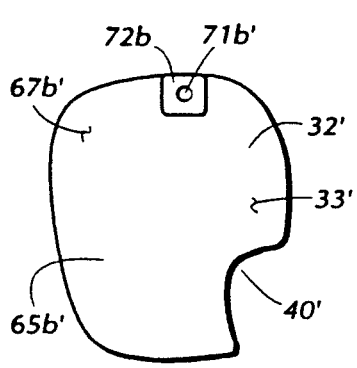
FIG. 12 is a right side isolated view of the mask of FIG. 10.
Figure 13:
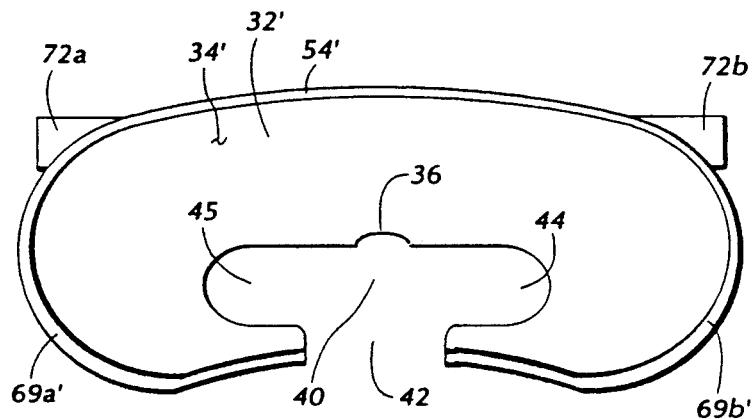
FIG. 13 is a rear isolated view of the mask of FIG. 10.
Figure 14:
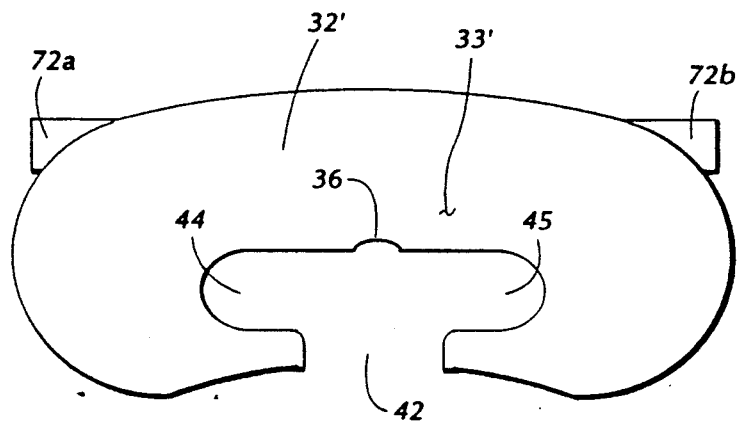
FIG. 14 is a front isolated view of the mask of FIG. 10.

Refer also to FIGS. 7-9, which represent side, top cross-sectional, and perspective views, respectively, of the connector assembly 75, in accordance with the preferred embodiment of the present invention. The connector assembly 75 includes a clamp 5 and an arm assembly 79. The arm assembly 79 is shown including a unitary arm 80 which includes a mask screw hole 81 and a clamp screw hole 82. The arm assembly 79 further includes mask screw 77 and mask nut 78. When the arm assembly 79 is attached to the mask 30, the mask screw 77 extends through the mask screw hole 81 and the connector screw hole 71 of the side portion 65 for connection to the mask nut 78 adjacent the side portion inner surface 68. In the preferred embodiment of the present invention, the connection between the unitary arm 80 and mask 30 is a pivotal connection allowing for rotational movement of the unitary arm 80 about the mask screw 77.

The arm assembly 79 also includes a clamp screw 89 which pivotally connects the unitary arm 80 to the clamp 85. When assembled, the clamp screw 89 extends through the clamp screw hole 82 and through a bevelled vice hole 99 and a threaded vice hole 97 of an arm vice 98 of the clamp 85, as is shown in FIG. 8. The clamp 85 of the preferred embodiment of the present invention further includes a clamp nut 86 and a clamp body 91. The clamp nut 86 includes nut threads 88 and a smooth nut contact surface 87. The clamp body 91 includes the arm vice 98, a set of body threads 96, and two clamp jaws 90x, 90y. The body threads 96 are formed to interact with the nut threads 88 of the clamp nut 86. Each clamp jaw 90 includes a stirrup lip 93 and a compression incline 95 for interaction with the nut contact surface 87. The clamp jaws 90 are arranged to form a compression gap 94 and a stirrup port 92 for receipt of a stirrup 22.

During operation, and with reference to FIGS. 1-9, the IFR training device 10 of the preferred embodiment of the present invention is connected to a headset 15 which is worn on a pilot's head 12, as shown in FIG. 1, to block substantially all of a pilot's forward and peripheral views to restrict the pilot's vision to an aircraft instrument panel as seen through the viewing aperture 40. Since the aperture right side 44 extends closer to a side portion 65 than the aperture left side 45, a pilot's vision extends across the entire instrument panel even though the pilot is seated on the left side of the instrument panel.

Figure 15:
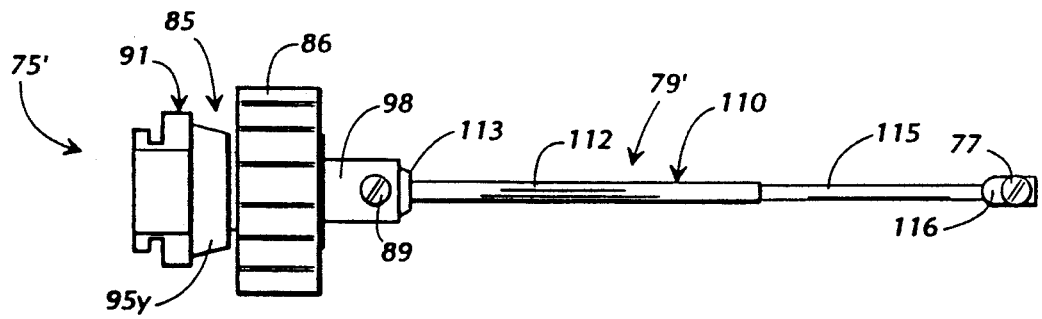
FIG. 15 is a side isolated view of a connector assembly in accordance with an alternate embodiment of the present invention.
Figure 16:
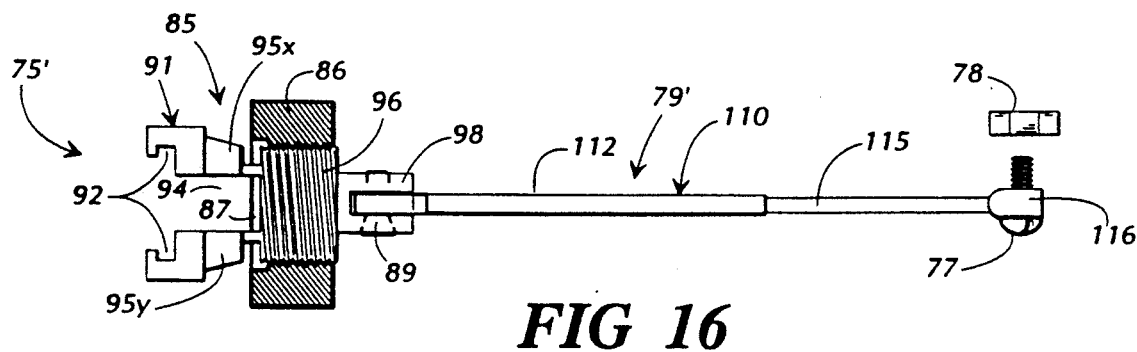
FIG. 16 is a top isolated view of the connector assembly of FIG. 15, showing a cross-sectional view of the clamp nut.

A pilot attaches the IFR training device 10 of the preferred embodiment of the present invention to the headset 15 by attaching each clamp 85 to a stirrup 22. FIGS. 7 and 8 show the clamp 85 in a closed configuration, wherein the nut contact surface 87 engages the compression inclines 95. FIGS. 15 and 16 show the clamp 85 of the preferred embodiment in an open configuration, wherein the nut contact surface 87 does not engage the compression inclines 95. To attach the clamp 85 to the stirrup 22, a pilot places the stirrup 22 into the stirrup port 92 of an openly-configured clamp 85. The clamp nut 86 is then rotated around the body threads 96 toward the stirrup 22 so that the nut contact surface 87 engages the compression inclines 95. As the clamp nut 86 is further tightened, the nut contact surface 87 interacts with the compression inclines 95 to move the clamp jaws 90 closer together to reduce the size of the compression gap 94 and the stirrup port 92, thus gripping the stirrup 22. The stirrup lips 93 grip around the stirrup 22 to prevent the clamp 85 from separating from the stirrup 22.

The placement of the clamp 85 on the stirrup 22 determines the proximity of the mask 30 to a pilot's face. The location of the clamp 85 can be easily adjusted by loosening the clamp nut 86 to reduce the grip on the stirrup 22. As the clamp 85 is moved across the stirrup top 23 closer to the headband 17 from the stirrup bend 24, the mask 30 is moved closer to a pilot's face. Alternately, as the clamp 85 is moved away from the headband 17 toward the stirrup side 25, the mask 30 is moved further away from a pilot's face.

The pivotal connections of the connector assembly 75 at the mask screw 77 and the clamp screw 89 allow a pilot to adjust the vertical location and rotational orientation of the mask 30. Although the connections are pivotal, in the preferred embodiment of the present invention, the connections are also so tight that the mask 30 is completely supported by the connector assembly 75 and does not substantially rest on the pilot's nose or any other portion of the pilot's face.

The adjustability allows a pilot to move the mask 30 up and away from the pilot's face and primary field of vision when the pilot wishes to discontinue IFR training without compromising safety or disturbing the seal between the earphones 20 and the pilot's ears. Likewise, the IFR training device 10 may remain attached to the headset 15 after the headset 15 is removed, allowing a subsequent pilot to mount the headset 15 onto the pilot's head and then optionally move the mask 30 downward during flight for IFR training. In the preferred embodiment of the present invention, the unitary arm 80 is laterally flexible to enable the earphones 20 to be easily separated for placement on a pilot's head. In other words, the clamp 85 is movable with respect to the mask 30 in the lateral directions indicated as "x" and "x'" in FIG. 8, while the arm assembly 79 is connected therebetween.

It is intended that the scope of the present invention include various alternate embodiments. However, it should also be understood that the each of the embodiments disclosed herein, including the preferred embodiment, includes features and characteristics which are considered independently inventive. Accordingly, the disclosure of variations and alterations expressed in alternate embodiments is intended only to reflect on the breadth of the scope of the present invention without rendering obvious or unimportant any of the specific features and characteristics of any of the embodiments.

In alternate embodiments of the present invention, the screws, nuts, and bolts shown in the preferred embodiment of the present invention are replaced by other types of fasteners, including pins, rivets and other types of screws, nuts, and bolts. Additionally, various types of washers are utilized to increase fastener reliability and pivotal motion consistency.

In other alternate embodiments of the present invention, the outer surfaces 33, 52, 57, 67 of the mask 30 are reflective of light to reduce heat between the mask 30 and a pilot's face. Such reflectivity is accomplished, in a subset of those alternate embodiments, through use of an additional layer of reflective material. In one embodiment of that subset of alternate embodiments, the reflective layer is readily removable from the outer surfaces 33, 52, 57, 67 of the mask 30, and in another embodiment, the reflective layer is permanently attached to the mask 30.

Refer also to FIGS. 10-14, which show top, bottom, right side, rear, and front views, respectively, of a mask 30', in accordance with an alternate embodiment of the present invention. The mask 30' is similar to the mask 30 of the preferred embodiment of the present invention as shown in FIGS. 2-6. However, the mask 30' has a rounded appearance without facets or definitive separations between portions. Furthermore, two screw buttresses 72 are shown as part of the mask 30' for attachment to a connector assembly 75. The connector screw holes 71' are threaded for receipt of mask screws 77. In addition, the front aperture edge 35' is shown forming a nose valley 36.

Refer now to FIGS. 15 and 16, which show side and top cross-sectional views, respectively, of connector assembly 75', in accordance with an alternate embodiment of the present invention. As previously noted, the clamp 85 is that of the preferred embodiment of the present invention. However, the arm assembly 79' includes an extendable strut 110. The extendable strut 110 includes two telescopic members, a clamp-side link 112 and a mask-side link 115. The clamp-side link 112 is connected to a clamp-side screw holder 113 which is pivotally connected to the arm vice 98 by the clamp screw 89. The mask-side link 115 is connected to a mask-side screw holder 116 which is attachable to a mask 30 by the mask screw & nut combination 77, 78.

In this alternate embodiment, the clamp-side link 112 and mask-side link 115 are hollow and have circular cross-sections. In other alternate embodiments of the present invention, the links 112, 115 have non-circular, including square or rectangular, cross-sections. The operation of the arm assembly 79' is considered to be clear upon understanding FIGS. 15 and 16. A pilot can readily adjust the proximity of the mask 30 by simply moving the mask 30 to adjust the length of the extendable strut 110 without needing to adjust the location of the clamp 85 along the stirrup 22.

Figure 17:
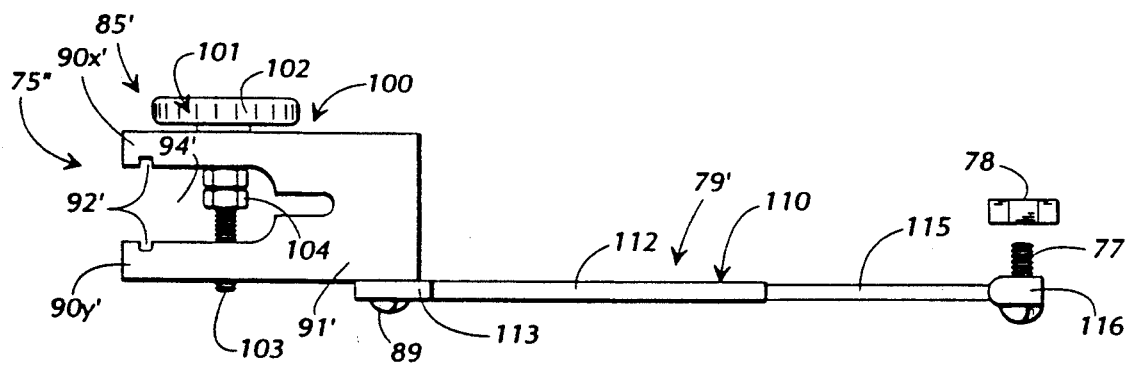
FIG. 17 is a top isolated view of a connector assembly in accordance with another alternate embodiment of the present invention.
Figure 18:
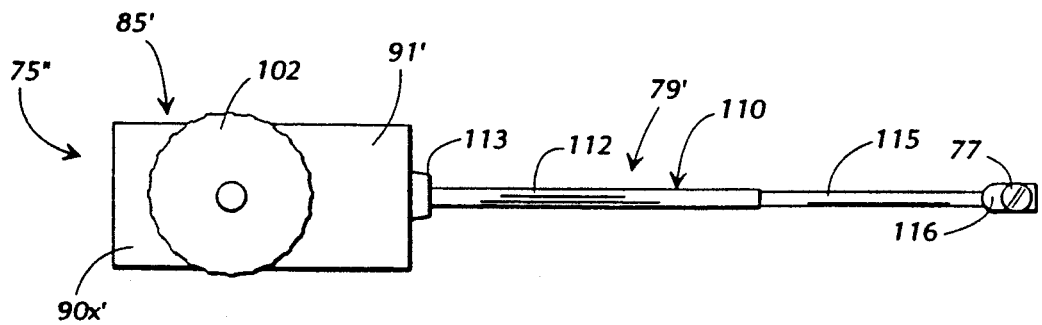
FIG. 18 is a side isolated view of the connector assembly of FIG. 17.

Refer now to FIGS. 17 and 18, which show top and side views, respectively, of connector assembly 75", in accordance with another alternate embodiment of the present invention. The arm assembly 79' is identical to that shown in FIGS. 15 and 16. However, the clamp 85' is noticeably different from the clamp 85 of FIGS. 15 and 16. The arm assembly 79' is connected to the clamp 85' by the clamp screw 89 which extends into a threaded hole (not shown) in the clamp 85'. Like the clamp 85 of the preferred embodiment, the clamp 85' includes a clamp body 91' which includes two clamp jaws 90' which form a compression gap 94' and a stirrup port 92'. However, a grip screw assembly 100 is utilized to adjust the size of the stirrup port 92'.

The grip screw assembly 100 includes a grip screw 101 and securing nuts 104. The grip screw 101 includes a screw head 102 and a threaded end 103. The threaded end 103 extends through a smooth screw hole (not shown) in the clamp jaw 90x' and into a threaded screw hole (not shown) in the clamp jaw 90y'. The securing nuts 104 secure the grip screw 101 to the clamp jaw 90x' without preventing relative rotation of the grip screw 101. As the grip screw 101 is rotated, the size of the stirrup port 92' is altered, allowing for connection, disconnection, and re-location of the clamp 85' with respect to the stirrup 22.

Figure 19:
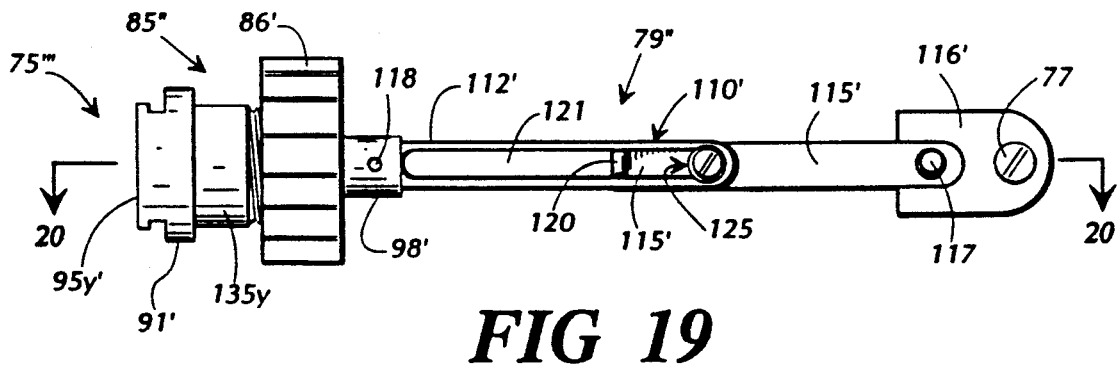
FIG. 19 is a side isolated view of a connector assembly in accordance with another alternate embodiment of the present invention.
Figure 20:
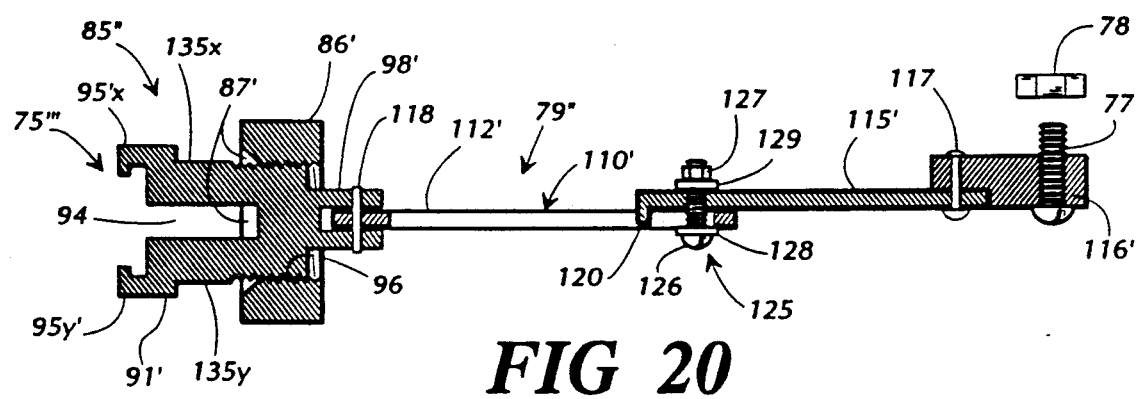
FIG. 20 is a top cross-sectional view of the connector assembly of FIG. 19 taken along line 20—20.

Refer now to FIGS. 19 and 20, which show side and top cross-sectional views, respectively, of a connector assembly 75''', in accordance with another alternate embodiment of the present invention. The connector assembly 75''' includes both an alternate clamp 85" and an alternate arm assembly 79".

The clamp 85" is very similar to the connector clamp 85 of the preferred embodiment. However, the connector clamp 85" of FIGS. 19 and 20 includes a clamp body 91' having compression plateaus 135, as opposed to the compression inclines 95 of the clamp 85 of the preferred embodiment of the present invention. Furthermore, the clamp nut 86' of this alternate embodiment includes an inclined nut contact surface 87', as opposed to the axial nut contact surface 87 of the clamp nut 86 of the preferred embodiment. Although the engaging surfaces 135 and 87' differ from corresponding surfaces of the preferred embodiment, rotation of the clamp nut 86' with respect to the clamp body 91' produces the same compressive result on the compression gap 94 as that of the preferred embodiment.

The arm assembly 79" includes an extendable strut 110' which is connected to the arm vice 98' of the clamp body 91' through a vice pin 118 and connected to a mask-side screw holder 116' through a holder pin 117. A mask screw 77 and mask nut 78 are use to connect the connector assembly 75''' to the mask 30. The extendable strut 110' includes a clamp-side link 112' and a mask-side link 115' connected together by an adjustment assembly 125 which includes an adjustment screw 126, a screw washer 128, an adjustment nut 127, and a nut washer 129. The clamp side link 112' includes a finger recess 121 which extends lengthwise along the clamp side link 112' and laterally through the clamp side line 112'. The adjustment screw 126 extends through the finger recess 121 and through a hole in the mask-side link 115' which keeps the adjustment assembly 125 stationary with respect to the mask-side link 115'. A link finger 120 also extends downward into the finger recess 121.

To adjust the length of the extendable strut 110', a pilot first loosens the adjustment assembly 125 to render the links 112', 115' slidable with respect to each other. FIGS. 19 and 20 show the extendable strut 110' in a maximum extension configuration. To shorten the extendable strut 110', the links 112', 115' are forced together, causing the link finger 120 and adjustment screw 126 to slide along the clamp-side link 112' and through the finger recess 121. After a desired extendable strut 110' length is achieved, the adjustment assembly 125 is tightened to secure the configuration. The link finger 120 and adjustment screw 126 cooperate to transfer supporting forces from the mask-side link 115' to the clamp-side link 112'.

Figure 21:
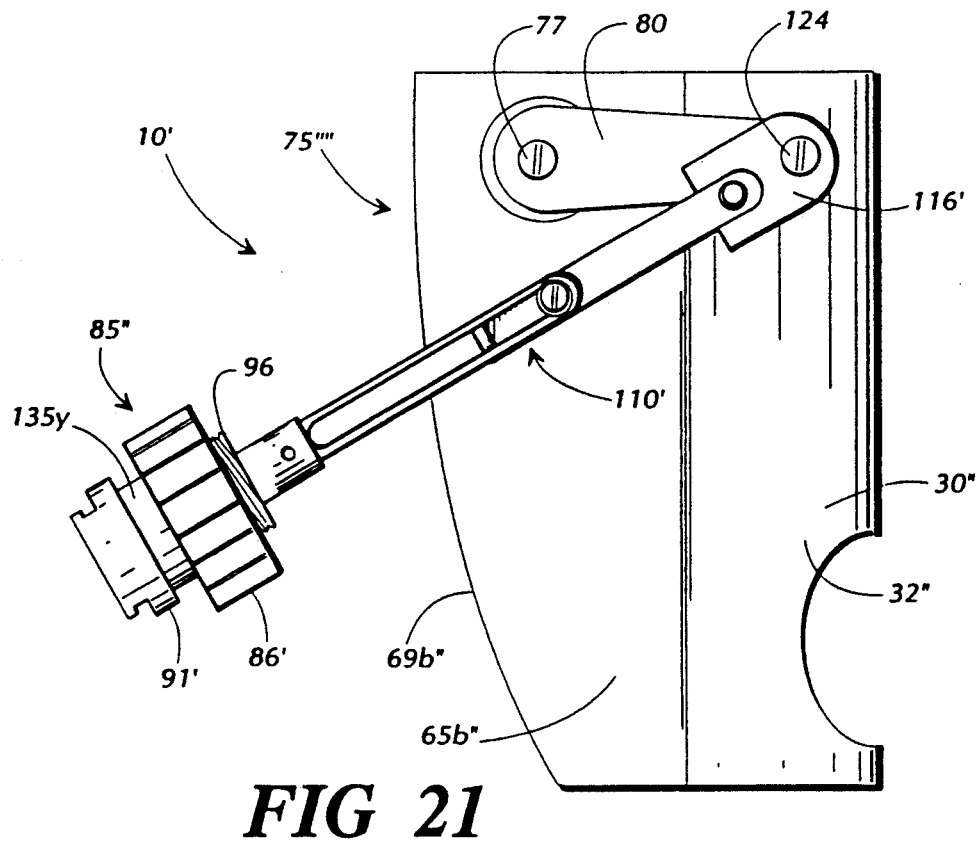
FIG. 21 is a side view of an IFR training device in accordance with another alternate embodiment of the present invention.

FIG. 21 shows a side view of an IFR training device 10' in accordance with another alternate embodiment of the present invention. The mask 30" is similar to the mask 30 of the preferred embodiment. However, the front portion 32 is rounded without facets, and the side facial edge 69" is curved in an alternate pattern. Two pivotally-connected strut portions, a unitary arm 80 and an extendable strut 110', are included in the connector assembly 75''''. The extendable strut 110' and clamp 85" are identical to those of the connector assembly 75''' shown in FIGS. 19 and 20. The clamp 85" is shown in a closed configuration in FIG. 21, while the configuration shown in FIGS. 19 and 20 is open.

Rather than being connected directly to the mask 30", the mask-side screw holder 116' is pivotally connected to the unitary arm 80 through an arm-link fastener 124. In this alternate embodiment of the present invention, the arm-link fastener 124 includes a screw & nut (not shown) combination. The unitary arm 80 is connected to the mask 30" through a mask screw 77 and mask nut 78 (not shown).

In another alternate embodiment of the present invention, there are no arm assemblies 79. Rather, the side portions 65 of the mask 30 extend rearwardly to connect directly to the clamp 85. In other alternate embodiments, a rubber edge guard is connected to one or more of the facial edges 54, 59, and 69 of the mask 30. Such a rubber guard, having a "C"-shaped cross-section for gripping a mask edge, cushions any contact between a pilot's head 12 and the mask 30. Other alternate embodiments of the present include spring-biased clamps which utilize springs, rather than threads, to grip a headset. Still other embodiments include clamps which are similar to the clamps 85 of the preferred embodiment, yet are attached to connecting arms with alternate orientations to connect to the headset headband 17 or other portions of a headset 15. Other alternate embodiments include one or more connector assembly connections which are rigid, thus restricting movement, and other embodiments include connector assembly connections which are ball-pivotal and allow for even greater freedom of movement between the headset and masks. Furthermore, other alternate embodiments include masks with hinge devices for folding the connector assemblies like personal eyewear for storage.

While the embodiments of the present invention which have been disclosed herein are the preferred forms, other embodiments of the apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. Pilot vision restriction apparatus for use with a headset during piloting an aircraft, said apparatus comprising:
    a mask means for partially occluding a pilot's vision by blocking pilot lines of sight which extend outside an aircraft and only permiting pilot lines of sight which extend to points within the aircraft, wherein said mask means includes, at least, a shield member defining a viewing aperture; and
    a connection means for connecting said mask means to a headset.

2. Pilot vision restriction apparatus for use with a headset during piloting an aircraft said apparatus comprising:
    a mask means for partially occluding a pilot's vision and including, at least, a completely opaque shield member defining a viewing aperture; and
    a connection means for connecting said mask means to a headset.

3. Pilot vision restriction apparatus for use with a headset during piloting an aircraft, said apparatus comprising:

a mask means for partially occluding a pilot's vision; and a connection means for connecting said mask means to a headset, said connection means including at least, two arm members extending rearwardly from opposing sides of said mask means, each of said two arm members including at least two pivotally connected strut portions.

4. Pilot vision restriction apparatus for use with a headset during piloting an aircraft, said apparatus comprising:

a mask means for partially occluding a pilot's vision; and a connection means for connecting said mask means to a headset, said connection means including, at least, a headset connector means for removably clamping said connection means to a headset, said headset connector means includes, at least, headband clamp means for removably clamping said connection means to a headband of a headset.

5. Instrument Flight Rules (IFR) training apparatus for use during training for piloting an aircraft in conjunction with a headset having a pair of earphones supported by earphone stirrups, said apparatus comprising:

a mask means for partially occluding a pilot's vision, said mask means including, at least, an opaque shield member defining a viewing aperture, wherein said mask means blocks pilot lines of sight extending outside an aircraft, said opaque shield member including, at least, a front lateral section and two rearwardly extending side sections attached to opposing sides of said front lateral section; and a connection means for so pivotally connecting said mask means to a headset that said mask means in a completely supported by the headset and movable to a location up and away from a pilot's face, said connection means including, at least, shield connector means for connecting said connection means to said side sections of said opaque shield member, two arms members extending rearwardly from said shield connector means, and headset stirrup connector means for removably and pivotally clamping said two arm members to headset earphone stirrups.

6. Vision occlusion apparatus for use by an aircraft pilot, in conjunction with a headset, to restrict the pilot's vision to points within the aircraft, said apparatus comprising:

a shield member including, at least, a first side, a second side, wherein said first side and said second side oppose each other, and a view opening;

a first arm member including, at least, a first end and a second end, wherein said first end of said first arm member is connected to said first side of said shield member, a second arm member including, at least, a first end and a second end, wherein said first end of said second arm member is connected to said second side of said shield member;

a first headset connector clamp connected to said second end of said first arm member; and a second headset connector clamp connected to said second end of said second arm member, wherein said connection between said first arm member and said shield member, said connection between said second arm member and said shield member, said connection between said first arm member and said first headset connector clamp, and said connector between said second arm member and said second headset connector clamp are pivotal connections, and wherein said first headset connector clamp and said second headset connector clamp are adjustable and readily removable from a headset.

7. In combination:

a headset including, at least, a headband, and two earphones assemblies including, at least, muff members and stirrup means for connecting said muff members to said headband; and a mask assembly connected to said headset and including, at least, a shield member, and a connection means for connecting said shield member to the headset, said connection means including, at least, means for connecting said shield member to said stirrup means.

8. In combination:

a headset including, at least, a headband, and two earphones assemblies; and a mask assembly connected to said headset and including, at least, a shield member, and a connection means for connecting said shield member to the headset, said connection means including, at least, two arm members and two headset connector clamps.

* * * * *